June 23, 1970
A. P. WATERSON
3,516,497
LAND LEVELER
Filed July 30, 1968
3 Sheets-Sheet 1
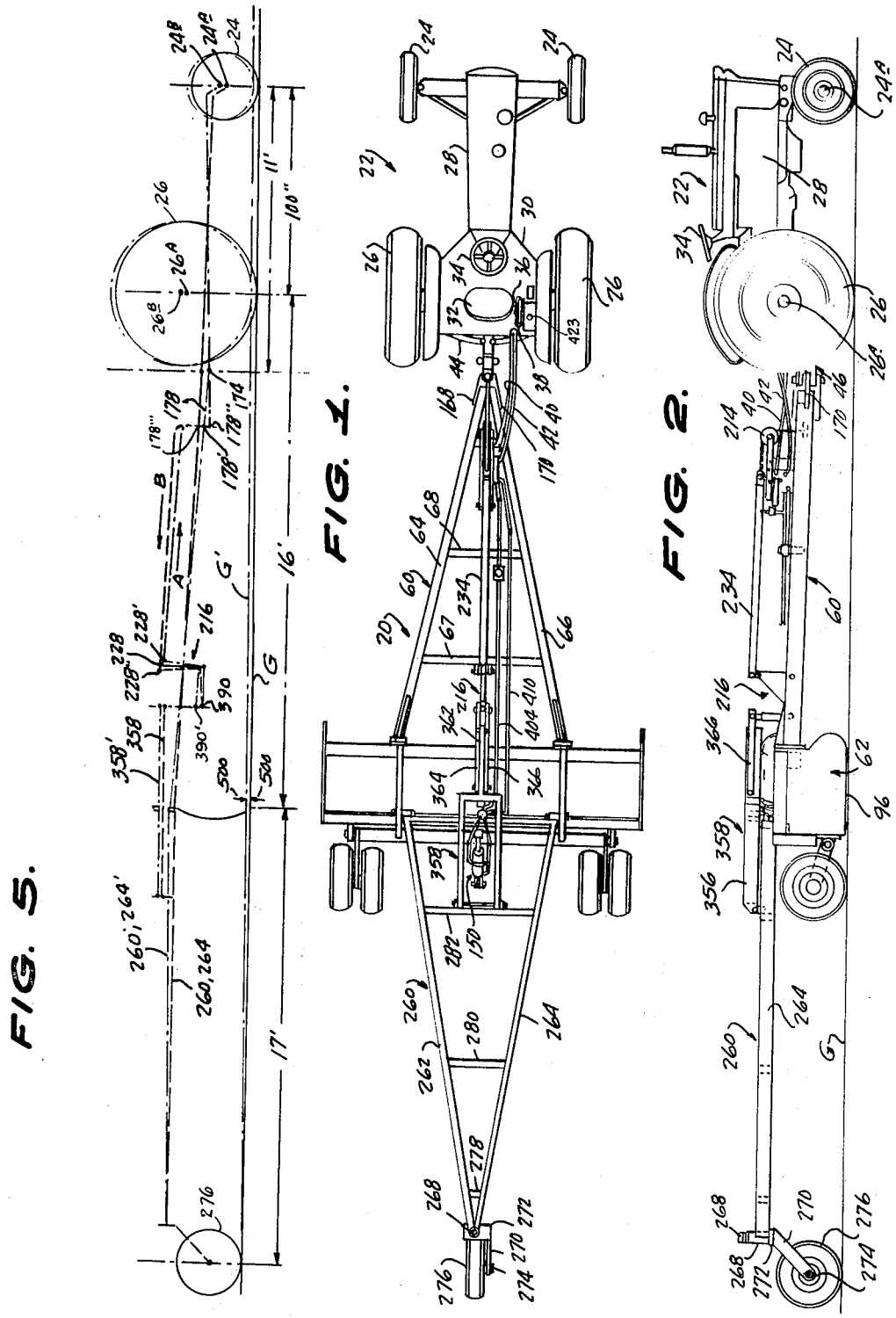
INVENTOR.
ARTHUR P. WATERSON,
BY Kimmel, Crowell & Weaver.
ATTORNEYS.

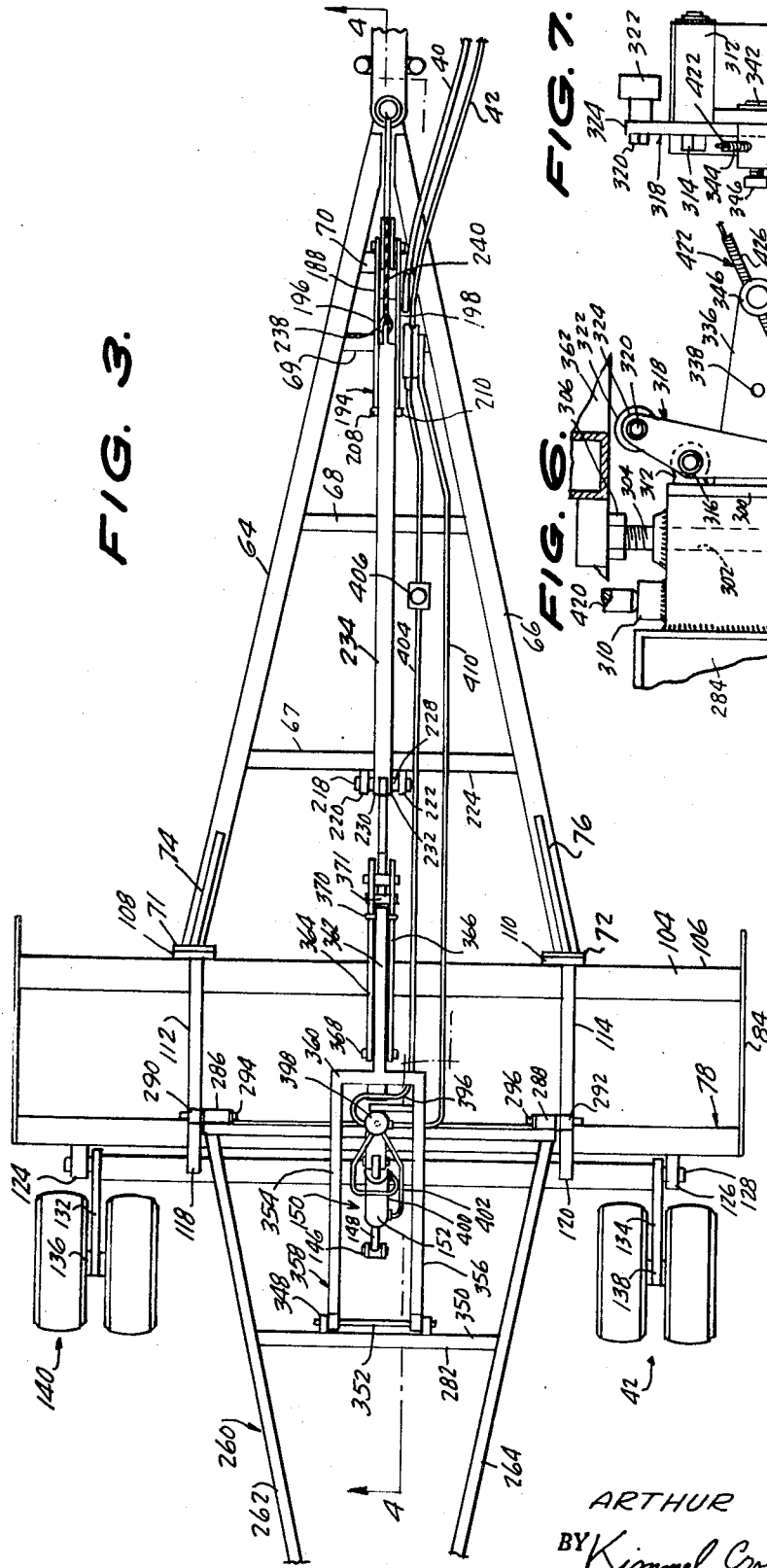

June 23, 1970 A. P. WATERSON 3,516,497
LAND LEVELER
Filed July 30, 1968 3 Sheets-Sheet 3
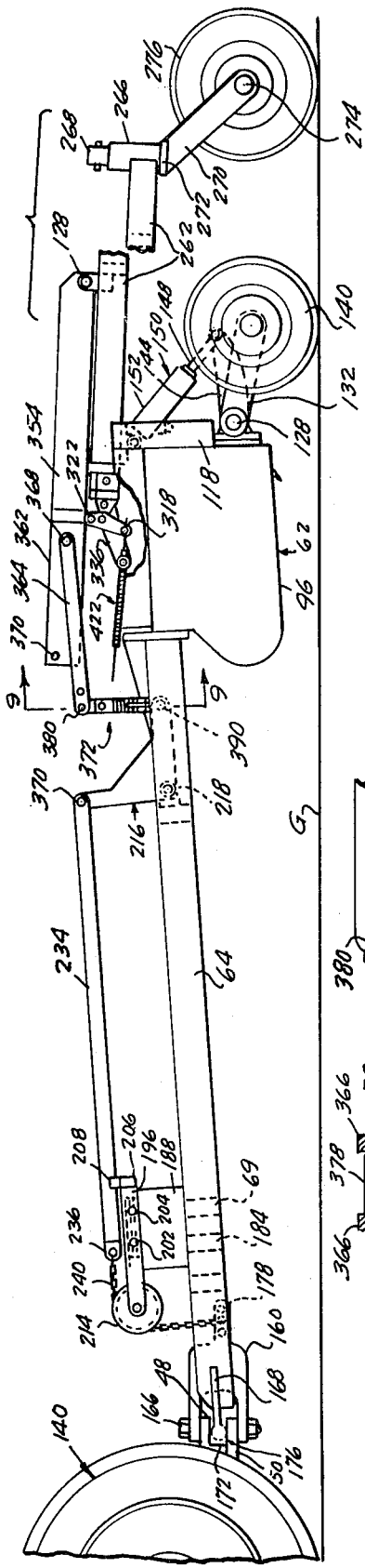
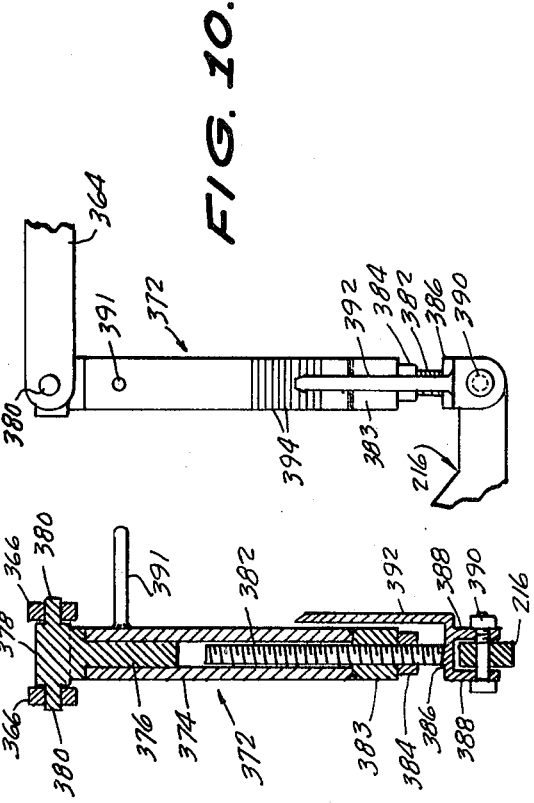
INVENTOR.
ARTHUR P. WATERSON,
BY
Kimmel, Crowell & Weaver
ATTORNEYS.

United States Patent Office 3,516,497
Patented June 23, 1970

3,516,497
LAND LEVELER
Arthur P. Waterson, Box 415,
Dighton, Kans. 67839
Filed July 30, 1968, Ser. No. 748,736
Int. Cl. E02f *3/76*
U.S. Cl. 172—4.5        10 Claims

ABSTRACT OF THE DISCLOSURE

An articulated land leveling machine comprising the combination of a conventional tractor for towing a hitch on which is mounted a ground engaging scraper blade to scrape and fill ground to a predetermined depth and including manually operable means for presetting the cutting depth, the machine further comprising a trailer having a rear supporting wheel and means connecting the hitch and trailer for pivotal movement relative to one another about a horizontal axis, the rear wheel taken together with the tractor front wheels cooperating to provide feeler or sensing means, and a hydro-mechanical system on the hitch and trailer actuated by means on the tractor responsive to the sensing means to automatically maintain the preset cutting depth of the scraper blade and feeler wheels in a common plane when in their respective ground-engaging positions, and wherein the control means for the hydro-mechanical system comprises an actuating yoke connected to the tractor drawbar and being operable in response to the vertical pivotal movement of the sensing wheels relative to the axis of the rear wheels of the tractor.

BACKGROUND OF INVENTION

This invention relates to ground moving equipment or machines for excavating or filling earth and, more specifically, the invention pertains to a wheeled scraper having an adjustable transverse scraping blade.

Perhaps the most pertinent prior art with respect to this invention comprises my own U.S. patents, No. 3,034,239, which issued May 15, 1962, Pat. No. 3,103,078, which issued on Sept. 10, 1963, and Pat. No. 3,353,288, bearing the issue date of Nov. 21, 1967, all of these patents carrying the common title, "Land Leveler."

All of these patents and the present invention are directed to a common end, namely, to the provision of an efficient machine or device for leveling and filling large areas of ground with the expenditure of but minimum time. All of these patents and the mechanism of the present invention employ a hydro-mechanical system for vertically adjusting the scraper blade and an automatic control for the system to maintain the predetermined and preset blade cutting depth. The machines or devices of the patents served the purposes and ends for which they were designed and intended, and these machines proved to be completely satisfactory in actual field use. However, the actual field testing and use of these machines has disclosed that the equipment of the patents required sophistication in the direction of simplicity without sacrificing their efficiency, utility and control accuracy, and it is the purpose of this invention to provide such machinery and equipment.

SUMMARY OF INVENTION

Thus, one of the primary objects of this invention is to provide a land leveling machine which is tractor towed and which includes a transversely mounted scraper blade together with automatically actuated means for varying the height of the blade in accordance with the contour of the ground traversed by the machine.

Another object of this invention is to provide a machine of the type generally described supra, the machine being particularly adapted for the leveling of ground protuberances and the filling of hollows formed in the ground.

A further object of this invention is to provide front and rear feeler or sensing wheels which coact with control means to vertically adjust, automatically, the height of the scraper blade.

A still further object of this invention resides in the provision of means for actuating a hydraulic piston and linkage therefor to automatically raise and lower the scraper blade in accordance with irregularities and the contour of the ground to be leveled.

This invention contemplates, as a still further object thereof, the provision of a machine of the type to which reference has been generally made above, the machine being non-complex in construction and assembly, simple to operate, relatively inexpensive to manufacture and maintain, and one which is rugged and durable in use. Other and further objects and advantages of the instant invention will become more manifest from a consideration of the following specification when read in light of the annexed drawings.

In the drawings:

FIG. 1 is a top plan view of a land leveler machine constructed in accordance with this invention;

FIG. 2 is a side elevational view of the machine of FIG. 1;

FIG. 3 is an enlarged fragmentary top plan view of the land leveler;

FIG. 4 is a longitudinal cross-sectional view, FIG. 4 being taken substantially on the vertical plane of line 4—4 of FIG. 3, looking in the direction of the arrows;

FIG. 5 is a diagrammatic view of the mechanical operation of the machine;

FIG. 6 is an enlarged fragmentary side elevational view of certain components of the control mechanism;

FIG. 7 is an end elevational view of the components shown in FIG. 6;

FIG. 8 is an enlarged fragmentary side elevational view of the machine similar to FIG. 2 but showing the scraper blade raised to its towing position for movement from one locale to another;

FIG. 9 is an enlarged fragmentary detail cross-sectional view of the depth setting apparatus, FIG. 9 being taken substantially on the line 9—9 of FIG. 8, looking in the direction of the arrows; and FIG. 10 is a side elevational view of the depth setting apparatus.

Referring now more specifically to the several figures of the drawings, the land leveler machine according to this invention is generally designated by reference numeral 20. The machine 20 includes a conventional farm tractor 22 having the usual pair of front steering wheels 24, 24 and the power driven rear wheels 26, 26. The wheels 24, 24 and 26, 26 support the usual and conventional chassis (details thereof not being shown) from the axles 24A, 26A which, in turn, supports an internal combustion engine 28, and operator's platform 30 and an operator's seat 32 which is juxtaposed relative to the steering wheel means 34. Lever control means 36 for a conventional servo-valve, to which further references will be made below, is provided at one side of the operator's seat 32 and within his convenient reach. The tractor 22 is provided with a conventional hydraulic fluid power system (not shown) which includes a suitable coupler 38 to which are connected one of the ends of a pair of hydraulic fluid power supply and return con duits 40, 42, respectively.

The chassis of the tractor 22 includes a rear end transverse cross-frame member 4 to which is rigidly connected a bifurcated drawbar 46 having rearwardly projecting normally vertically spaced arms 48, 50.

At 60 is denoted a hitch for supporting scraper means 62. The hitch 60 is seen to comprise a pair of forwardly converging normally horizontal side frame members 64, 66 connected together by a plurality of transverse cross-frame members 67, 68, 69 and 70, the cross-frame members being spaced from one another, are fixed and parallel to each other, and are of sufficient number to lend the needed rigidity to the hitch 60. The rear or diverging ends of the side frame members 64, 66 are rigidly connected to a pair of vertically extending front butt plates 71, 72, respectively, which are turned at inside acute angles relative to the longitudinal axis of their respective associated side frame member so as to be substantially parallel and in coplanar relation relative to one another. Reinforcing gusset plates 74, 76 are rigidly connected on the upper ends of the butt plates 71, 72 and to adjacent portions of the side frame members 64, 66, respectively.

The scraper assembly or means 62 comprises a substantially U-shaped support member 78 including a normally upright substantially rectangular bight wall 80 from the opposed ends of which laterally and forwardly project, respectively, the normally upright side arms 82, 84 disposed in parallelism relative to one another. Projecting forwardly from the upper end of the bight wall 80 is an integrally formed flange 86 which extends transversely between the side arms 82, 84 and which overhangs, in vertically spaced relation, a similar forwardly projecting integrally formed flange 88 disposed at the lower end of the bight wall 80. Fixedly connected to the forward terminal ends of the flanges 86, 88 is a concave-convex back plate 90, the concave side thereof facing forwardly. Preferably, and for support purposes, a portion of the convex side of the back plate 90 engages the bight wall 80. The back plate 90 extends the full distance between the side arms 82, 84 to which it is also secured, and its lower edge 92 is substantially coplanar with the lower edges 94, 96 of the side arms 82, 84, respectively. Conventional means 98 connect a conventional scraper blade 100 to the lower end of the back plate 90 with its cutting or lower operative edge 102 projecting below and beyond the edges 92, 94 and 96.

Extending between the upper forward or outer corners of side walls 82, 84 is an elongated substantially hollow rectangular beam 104, the beam 104 being fixedly connected thereto by conventional means (not shown). The beam 104 includes a front upright side wall 106 to the exterior side of which are rigidly connected a pair of abutment plates 108, 110 disposed in coplanar relationship relative to one another. The abutment plates 108, 110 are spaced inwardly on the beam 104 a distance matching the distance between the butt plates 71, 72 to which they are, respectively, fixedly connected in face-to-face relationship by conventional means.

The upper end of the scraper means 60 is spanned by a pair of cross-braces 112, 114 having forward ends fixedly secured to, respectively, the abutment plates 108, 110 and to the upper side wall 116 of the beam 106. The rear or other ends of the cross-braces 112, 114 span and are secured to the upper sides of the flange 86. The outer rear terminal ends of the cross-braces 112, 114 abut against and are secured to the upper ends, respectively, of a pair of upright substantially rectangular brace-beams 118, 120, the latter having sides thereof fitting flush against the back side of the bight wall 80 to which they are rigidly connected.

The scraper assembly or means 60 further includes wheel supporting means 122 comprising a pair of spaced conventional journal boxes 124, 126 which are fixedly connected to the back side of the bight wall 80 adjacent the side walls 82, 84. The boxes 124, 126 receive and support the opposed ends of an elongated shaft 128. Telescoped over and mounted for rotation on the shaft 128 between the journal boxes 124, 126 is an elongated sleeve 130. The shaft 128 and its associated sleeve 130 may, if desired, be provided with additional support means comprising a collar 131 which engages about a central portion of the sleeve, the collar 131 being fixedly secured to the back side of the bight wall 80 as by the bracket 129. Fixedly connected to each end of the sleeve 130 is one of the ends, respectively, of a pair of rearwardly projecting wheel support arms 132, 134, the other or rearwardly extending ends of the arms 132, 134 mounting axles 136, 138, respectively, for the pairs of dual wheels 140, 142, respectively.

Fixedly connected to the sleeve 130 intermediate its ends is one end of an upwardly curved or arcuate lever 144. The other or rearwardly extending end of the lever 144 is pivotally connected at 146 to the outer end of a reciprocable piston rod 148 of a hydraulic cylinder 150. The casing 152 of the hydraulic cylinder 150 carries end lugs 154, conventional in this art, and which are pivotally connected at 156 to the rearwardly projecting end of a connector bar 158 that extends transversely of the flange 86 and which is rigidly affixed thereto. It will be thus understood that operation of the hydraulic cylindner 150 will cause the wheels 140, 142 to pivot about the axis of the sleeve 130 simultaneously and in the same direction about their common axis of rotation.

The hitch 60 at its forward or apex end receives an upright substantially flat yoke 160 between the adjacent sides of the converging ends of the side frame members 64, 66. The forward or leading end of the yoke 160 is bifurcated to form a pair of vertically spaced arms 162, 164 which engage over the remotely disposed sides of the arms 48, 50 of the drawbar 46. A hitch pin 166 pivotally connects the arms 162, 164 on the drawbar 46 whereby the yoke 160 is swingable about the vertical axis of the hitch pin 166.

The remotely disposed sides of the side frame members 64, 66 at the outer terminal ends thereof at the apex end of the hitch 60 carry forwardly projecting arms 168, 170 which support a socket 172 which engages around a spherical portion 174 integrally formed on the pin 166 and located between the arms 48, 50 to provide a universal ball joint hitch 176. To serve a function to be set forth below, the rear or trailing end of the yoke 160 is integrally connected to a rearwardly extending bar 178 through which transversely extends a plurality of adjustment openings 180.

Mounted on the cross-frame member 69 is an upright substantially T-shaped mounting plate 182 having a downwardly extending stem 184 provided with a downwardly opening slot 186 formed therein (see FIG. 4) in which is received the cross-frame member 69. Conventional means (not shown) effect a rigid connection between these two elements. To one side of the crosshead 188 and connected by bolts 190 is a conventional hydraulic fluid flow divider 192, the divider being connected in the tractor hydraulic fluid power system, as will be described below.

Adjustably mounted on the upper end of the crosshead 188 is an elongated carriage 194 comprising a pair of laterally spaced substantially flat parallel bars 196, 198. The bars 196, 198 are disposed flush against the upper end of the crosshead 188 on the remotely disposed sides thereof and may be adjusted in the direction of their elongation and fixedly connected therein by conventional means such as the bolts 202 and cooperating nuts (not shown), the bolts riding in the elongated slots 204 which extend transversely through each bar 196, 198. A substantially V-shaped guide block 206 having arms 208, 210 is fixedly connected to the adjacent pair of inner ends of the bars 196, 198, to serve a function to be described, and the adjacent outer ends of these bars support a normally horizontal shaft 212 on which is rotatably mounted a pulley wheel 214.

Reference numeral 216 denotes a bell-crank lever having a first end pivotally connected at 218 between a pair of lugs 220, 222, the latter being rigidly connected to the forwardly facing end wall 224 of the cross-frame member 67. The second end of the bell-crank lever 216 is pivotally connected on pivot pin 228 between the bifurcated arms 230, 232 at one end of an elongated lever 234, the other end of the lever 234 being slidably received between the arms 208, 210 of the block 206. This last named or other end of the lever 234 terminates in a web 236 on which is secured the looped end 238 of a flexible cable 240. As is seen in FIGS. 2 and 4, the cable 240 is trained about the pulley wheel 214 and its other end is selectively engaged and anchored in one of the openings 180.

Reference numeral 260 indicates a trailer chassis comprising a pair of elongated rearwardly converging side frame members 262, 264 which, at their rear or apex end of the frame 260, are rigidly connected to an upright journal 266 in which a shaft 268 is journaled for rotation about a vertical axis. The lower end of the shaft 268 is rigidly connected to a downwardly and rearwardly extending offset arm 270 via the offset plate 272. The lower end of the arm 270 carries a horizontal axis 274 which mounts a rear wheel 276 rotatably thereon. The arrangement is such that the rear wheel 276 is caster mounted.

A plurality of transverse cross-frame braces 278, 280, 282 and 284 extend between and are rigidly secured to the side frame members 262, 264 to provide the required rigidity for the trailer chassis 260, and the innermost one of these braces, 284, is disposed at the adjacent pair of divergent ends of the side frame members 262, 264. At each end of the brace 284 is fixedly connected a horizontally elongated hollow cylindrical collar 286, 288, respectively, which are disposed in end-to-end abutting relationship with respect to a pair of apertured lugs 290, 292, and the latter are rigidly connected to the upper side of each of the cross-braces 112, 114 adjacent their respective rear ends. Pivot pins 294, 296 connect the adjacent pairs of collars and lugs 286, 290 and 288, 292, respectively.

Also connected to the cross-frame brace member 284 and projecting forwardly therefrom is a substantially rectangular block 298 (see FIGS. 4 and 6) having a forward upright face plate 300. The block 298 is formed with an opening 302 to receive therethrough an adjustable stop bolt 304 having an enlarged upwardly extending flat head 306. To provide for vertical adjustment, the lower end of the bolt 304 is threaded into a nut 307 which is welded to the underside of the block 298 and which is locked in its preselected adjusted position by means of the lock nut 308. The rectangular block is also provided on its upper side with an upwardly facing boss 310 to serve a function to be described.

Integral with and projecting forwardly of the face plate 300 is a horizontally bored lug 312 in which a bolt 314 is carried and on which is pivotally mounted one end 316 of a bell-crank lever 318. Securing means 320 (conventional in nature) mounts a roller 322 on the upper second end 324 of the bell-crank lever 318, and conventional means 326 mounts a hollow cylindrical fitting 328 on a third end 330 of the bell-crank lever 318.

The fitting 328 is formed with a diametric bore 332 and is axially internally threaded to receive a set screw 334 therein to serve a function to be described, infra.

Integral with and also projecting forwardly of the face plate 300 is a flat upright tongue 336 having a laterally projecting abutment member 338 formed thereon and which is disposed in the counterclockwise path of travel of the end 328, reference being made to FIG. 6 of the drawings, to limit the throw of the bell-crank lever 318 in this direction.

A second fitting 340, similar to the fitting 328, is connected on the forward or free end of the tongue 336 by conventional means 342, the fitting 328 being hollow and cylindrical and having a diametrical bore 344 extending transversely therethrough. As before, the fitting 340 is axially internally threaded to receive a set screw 346 therein to serve a function to be described.

A pair of spaced standards 348, 350 are rigidly connected on the cross-frame brace 282 and support the opposed ends of a shaft 352 which extends therebetween. The outer ends of the arms 354, 356 of a substantially Y-shaped valve control bar or lever 358 are pivotally connected on the shaft 352 and the arms 354, 356 extend parallel to one another and normally extend parallel to the side frame members 262, 264. The inner ends of the arms 354, 356 are connected by a bight member 360, and a substantially flat upright stem element 362 has an end thereof fixedly connected on the bight member 360 intermediate its ends. The other end of the stem element 362 is embraced between a pair of substantially spaced and parallel levers 364, 366, the levers 364, 366 having their respective rear ends pivotally connected on the stem element 362 as by the pivot pin 368. As is seen in FIGS. 3 and 4, the forward or other ends of the levers 364, 366 extend below a cross-pin 370 carried on the stem element 362 and which projects laterally from its opposed sides to carry the stem element at all times while in normal operation, and operates as a safety device when the components of the machine are moved to their transport positions (see FIG. 8). A connecting spacer 371 extends across the levers 364, 366 adjacent to but spaced inwardly from the forward ends thereof. An abutment plate 361 projects from the bight 360 over the head 306 of the adjustable stop bolt 304 to control the scraper's speed of drop on down travel with the servo power on. The spacing between the plate 361 and the upper end of the bolt head 306 should be, preferably, .004″ to .005″ when in normal operating position.

Scraper depth control means is indicated by reference numeral 372 (see FIGS. 4, 8, 9 and 10). This means comprises an upright substantially hollow cylindrical member 374 in which is rotatably mounted the stem 376 of a swivel head 378 fixedly secured thereto for rotation therewith. As is seen in the drawings, the stem 376 is received within the open upper end of the cylindrical member 374, and a cross-shaft 380 extends diametrically across the head 378 and the levers 364, 366 at their forward ends are pivotally connected to the opposed ends of this shaft.

An elongated bolt 382 is threaded through a nut 383 welded to the lower end of the cylindrical member 374 and extends therein to provide axial adjustment therebetween, the adjustment being secured by lock nut 384. A platform 386 is rigidly connected to the lower end of the bolt 382, and a pair of spaced lugs 388 depend from the platform 386 to extend on opposite sides of the third end of the bell-crank lever 216 to which they are connected by a pivot pin 390. The platform 386 also has the lower end of a depth indicator bar 392 fixedly connected thereon, the upper terminal end of the bar 392 being juxtaposed and in spaced relation relative to a scale indicia 394 formed on the lower end of the cylindrical member 374 and extending axially and inwardly from that end thereof. Handle means 391 is secured to the upper end of the cylindrical member 374 and projects laterally therefrom.

A substantially flat upright rectangular hanger bracket 396 projects laterally from the arm 356 (see FIGS. 3 and 4) and to the bracket 396 is fixedly connected a conventional servo-valve 398. A pair of flexible reversible direction hydraulic fluid flow conduits 400, 402 connect the servo-valve 398 with the opposed ends of the hydraulic cylinder 150. A conduit 404 connects the servo-valve 398 with the supply side of the tractor hydraulic fluid system via the conventional high pressure filter device 406, the flow divider 192 and conduit 40. The fluid return side of the servo-valve 398 connects via conduit 410, flow divider 192 and conduit 42 to the fluid inlet side of the tractor's hydraulic system. One side of a high pressure relief valve 414 connects by coupler 416 with the flow divider 192 and the other side of the valve 414 connects by conduit 418 to the return conduit 410.

The servo-valve 398 is a conventional closed center type of servo valve construction and is provided with an actuating rod 420 for its valve spool (not shown). The valve spool and its actuating rod 420 is adapted for reciprocation and is spring loaded to move towards their lowermost positions. The rod 420, as is seen in FIG. 6, is aligned with the boss 310 and normally maintains engagement therewith throughout the normal operation of the machine 20. The servo-valve 398 is operatively connected with the hydraulic cylinder 150 in a maner to be described so that if the valve control bar 353 pivots to change its position in either vertical direction, the servo-valve 398 will admit hydraulic fluid under pressure to the hydraulic cylinder 150 to raise or lower the scraper 78 which, in turn, carries the boss 310 thereby pushing the valve spool against its spring pressure to move it to its closed center position and thereby automatically gain a holding parallel relationship between the valve control bar 353 and the trailer's side frame members 262, 264.

Means is provided to override the servo-valve 398, these means comprising the roller 322, the bell-crank 318 and a conventional Bowden cable 422. The roller 322, as is seen in FIGS. 4 and 6, is disposed below the underside of the stem element 362 normally in vertically spaced relation relative thereto, and one end of the flexible wire 424 of the cable 422 is extended through the bore 332 of the fitting 328 in which it is secured by the set screw 334.

The adjacent end of the cable sheath 420 extends through the opening 344 of the fitting 340 and is releasably secured therein by a set screw 346. The other end of the Bowden cable 422 is operatively connected with a conventional lever control means 423 (see FIG. 1) in the usual manner. The control means 423 is mounted on the tractor 22 within easy reach of the operator and is operable to push and/or pull the wire 422 relative to its sheath 426 to effect the operation of the bell-crank lever 318.

Having described in detail the component elements of the land leveler 20, the operation thereof will be briefly set forth below.

Land leveling is not to be confused with land clearing, and the problems are quite different, one from the other. In land clearing one might use, for example, a bulldozer or other similar machines, but in land leveling the major effort is made to reduce high land contours and to fill low areas in order that, as an end result, there is obtained a substantially planar ground surface such as is indicated by reference letter G. To obtain such a constant ground surface plane, it is quite clear that the scraper means, and in particular, the scraper blade edge of the leveler machine must be held in the desired plane as the machine traverses the terrain to be leveled. This end is obtained through the practice of this invention in the following manner.

With reference to FIGS. 1 to 4, inclusive, let it be assumed that the tractor 22 is being operated and that full hydraulic power is afforded to the servo-valve 398. Let it further be assumed that, by virtue of the depth control means 376, the cutting edge 102 of the blade 100 is disposed in the plane of the ground G and that the front wheels (sensors) 24 and the rear wheel 276 (also a sensor) make tangential contact with the same ground plane G, and that the ground plane G is the desired plane of level.

Now if the front sensor wheels 24 encounter a raised ground contour, the front end of the tractor 22 will tend to pivot about the axis of its rear wheels 26. When this occurs, the sensing yoke 160 will pivot counterclockwise (reference being made to FIG. 4) causing the cable 240 to be drawn downwardly and to thereby slide the lever 234 to the right. This causes the bell-crank lever 216 to pivot clockwise, and this motion is translated to the depth control means 372 causing it to move upwardly. When this movement is effected, a force in an upward direction is applied to the stem element 362 of the Y-shaped valve control bar 358, and since the stem element 362 is normally tangentially engaged by the cross-pin 370, the Y-shaped valve control bar 358 is caused to pivot counterclockwise (reference still being made to FIG. 4) around the axis of the shaft 352. The servo-valve 398 is then moved upwardly relative to its actuating lever 420 to admit hydraulic fluid under pressure to the hydraulic cylinder 150 through the conduit 400 to extend the piston rod 146. This causes the wheels 140, 142 to pivot downwardly about the axis of the shaft 128 in a counterclockwise direction, reference being made to FIG. 4 of the drawings, in order to maintain the scraper blade edge 102 in a new ground plane $G_1$ (see FIG. 5).

If, however, the front wheels 24 enter a depression, the pivotal action of the tractor 22 is reversed about the axis of the rear wheels 26. The sensing yoke 160 turns in a clockwise direction to enable the cable 240 and its connected lever 234 to pivot the bell-crank lever 216 in the reverse or counterclockwise direction whereby the depth control means 372 is drawn downwardly. This movement causes the Y-shaped servo-valve actuating lever 358 to move downwardly to effect the operation of its actuator 420 whereby the servo-valve 398 admits fluid through the conduit 402 to the hydraulic cylinder 150 in such a manner as to cause the piston rod 148 to retract and to thereby cause the wheels 140, 142 to pivot in a counterclockwise direction to lower the cutting edge 102 of the scraper blade 100.

For the purposes of this specification, the above description of the operation of the mechanical linkage of this device as operated by the front wheels 24, 24 will be considered as "positive action." It is obvious, however, that when operating the machine over uneven terrain, the tractor rear wheels will introduce unwanted vertical movement relative to the horizontal ground plane G. This may be considered as "negative action," and this negative action may be cancelled out or compensated for in the following manner of operation.

If it be assumed that the rear wheels 26, 26 of the tractor 22 are traveling over the same uneven ground, the same will introduce an exaggerated vertical movement of the drawbar 46 and the hitch ball or spherical portion 174, due to their overhang rearwardly of the tractor's rear axle. Compensation for this unwanted movement is obtained in the following manner.

If it be assumed that the device 20 of FIG. 2 is in operation, the wheels 276, 26 and 24, as well as the scraper blade edge 92, are tangent to the ground plane G. When the rear wheels 26 of the tractor 22 encounter a raised ground portion, the yoke 160 will move vertically upwardly and will cause the forward end of the hitch 60 to be pivoted about the pivotal connections at the pivot pins 294, 296. When this movement occurs, the flexible chain or cable 240 will be payed over the pulley 214 to the left as viewed in FIG. 4, and the lever 234 will shift in the same direction causing the bell-crank lever 216 to pivot about the pivotal connection 218 in such a manner as to maintain the pivotal connection 390 at exactly the same elevation above the ground plane G. This unwanted action introduced by the vertical movement of the rear wheels 26, 26 is cancelled by the reverse movement of the same linkage which is used by the front wheels 24, 24, however, the reversal is at the same rate of movement which causes the bell-crank lever 216 to pivot on its pivotal connection 218 so as to constantly maintain the pivotal connection 390 at a constant elevation above the ground plane G. While the bell-crank lever 216 is pivotally mounted at 218 and travels with the hitch 60, it is operated by the yoke 160 (see FIG. 4).

With the implement 20 in its normal leveling position, if the scraper 78 is loaded very heavily by encountering a ridge in the field, the rear wheels 26, 26 of the tractor 22 may begin to spin and dig into the ground G because of the power applied thereto. Under these circumstances, the drawer 46 will then lower the hitch ball 174. The scraper 78 will not raise or lower unless during this run the front wheels 24, 24 did run on lower ground, and then the servo action introduced by the front wheels 24, 24 would be subtracted from the action in progress as introduced by the movement of the rear wheels 26, 26. On the other hand, if the front wheels 24, 24 went up, the servo action would be added to the action in progress by the rear wheels 26, 26 (raising the scraper 78), or if the digging-in action cured itself, all components will return to normal.

To summarize, all vertical action of the rear wheels 26, 26 uses the hitch and scraper combination as a long lever, with rotation over the pivots 286, 288, and the yoke 160 through related linkage operates the bellcrank 216 to completely cancel the unwanted action introduced by the rear wheels 26, 26.

The front wheels 24, 24 operate only to maintain alignment for the scraper's cutting edge 102 with the front wheels 24, 24 and the rear trailer wheel 276, as set by the manually adjusted depth control 372.

No interference is caused by the positive vertical action of the front wheels 24, 24, versus the negative vertical action of the rear wheels 26, 26 of the tractor 22 while operating over uneven ground. This comprises a very simple dual purpose linkage.

It will be recognized that the servo-system here described has additional work to do as the scraper 78 cuts and fills. Clearly, it is almost unavoidable in turning out the land leveling operation to prevent the wheels 140, 142 from sinking into filled ground. Under these conditions, the servo-system will still maintain the scraper's position with the servo-valve 398 at its location on the valve control bar 354.

It is important that for positive and accurate control that the axis of the actuating rod 420 be contained in a vertical plane which includes the scraper edge 102. To position it otherwise would render the machine ineffective. It is also important that, at the beginning of any land leveling operation, the depth control gauge 372 be set at the desired cutting depth and it should be noted that the Y-shaped valve control lever 358 extends parallel to the side frame members 262, 264 of the trailer 260.

These criteria become important considering the size and weight of an actually constructed and field tested land leveler 20 which was drawn by a conventional tractor 22 having a wheel base of 100" and a total length of 132" between the axis of the front wheels 24, 24 and the pin 166. In this instance, the scraper blade 100 was mounted on a hitch 60 so that its edge 120 was 16' from the pin 166 and 17' from the axle 274 for a total length of 44'. FIG. 5 is a diagrammatic showing illustrating the principle of operations of such a machine.

The depth control gauge 372 of this machine has its indicia spaced at ¼" intervals and is constructed, preferably, in such a manner that, in cooperation with the servo-valve 398, one full turn of the handle means 391 will cause a .300" adjustment in the height of the scraper blade edge 102. If tractors of longer or shorter wheel base lengths are to be used, compensation may be made at the bar 178 at its connection with the cable 240. This is the only adjustment that need be made from tractor to tractor.

In a machine as specifically described above, if the center lines 24A (reference being made to FIG. 5) of the front wheels 24 be pivoted upwardly to tilt the tractor 28 about the center line 26A of the tractor rear wheel axles while the machine 20 is traveling, the movement of the axle or center lines of the front wheels 24 from the point 24A to the point 24B will turn the yoke 160 through the distance 178' to 178". The cable 240 and the lever 234 move in the direction of the arrow A to cause the pivotal connection of the bell-crank lever 218 to move clockwise from 228, 290 to 228', 290'. This movement causes the depth control gauge means 72 to move upwardly, pushing the levers 364, 366 against the cross-pin 370 to raise the Y-shaped valve control lever 358 and to effect consequent attendant operation of the actuating rod 420. The servo-valve 398 now operates the hydraulic cylinder 150 in such a manner as to cause the wheels 140, 142 to pivot counterclockwise (reference being made to FIG. 4) to raise the scraper blade edge 102 .772", exactly the calculated distance for the described machine to maintain the scraper blade edge 102 in a ground plane $G_1$ at the points of tangency therein of the front sensor wheels 24 and the rear sensor wheels 276. The actuation of the wheels 140 is continuous until the Y-shaped valve control lever 358 again becomes parallel with the side frame members 262, 264 and the servo-valve 398 moves to its closed center position, all in the usual manner. The initial and final parallelism is indicated at 260, 264 and 358 in the first instance, and 260', 264' and 358' in their second adjusted positions.

The control exercised when the rear wheels 26, 26 move upwardly to their dotted line position with the front wheel 24 and rear sensor wheel 276 tangent to the ground plane G is also illustrated in FIG. 5. Under these circumstances, the yoke 160 will travel the distance between 178' to 178''' causing the cable 240 and lever 234 to shift to the left as viewed in FIG. 4 and as is represented in FIG. 5 by the arrow marked B. The point of pivotal connection 228 moves to the left as is indicated at 228" while the pivotal connection at 390 remains exactly the same elevation above the ground line G. There is, thus, no vertical movement of the scraper means 78.

The Bowden cable 422, the bell-crank lever 318 and the control means 423 are utilized to override the servo-valve 358 when the operator of the machine 20 wishes to put the scraper blade 100 in transport position such as is illustrated, for example, in FIG. 8 of the drawings. It is desirable that an adjusted position such as is shown in FIG. 8 be provided for the scraper blade 100 in the event it is necessary that the machine 20 be drawn over roads, across furrows or fields with troughs therein and/or when it is necessary to stop for refueling. This adjusted position is achieved without disturbing the cutting depth control means 372.

To effect this transport position as is illustrated in FIG. 8, it is only necessary for the operator to actuate the control means 423 in such a manner as to cause the Bowden wire 422 to be drawn upwardly (to the right as viewed in FIG. 6) to cause the bell-crank lever 318 to pivot in a counterclockwise direction whereby the roller 322 is caused to engage an adjacent portion of the underside of the stem 362 to cause the Y-shaped valve actuator control lever 358 to pivot upwardly about its shaft 352. This introduces hydraulic fluid in the hydraulic cylinder 150 to cause the wheels 140, 142 to pivot counterclockwise (reference being made to FIG. 4) thereby elevating the scraper means 78 together with the cutter blade 100 and its edge 102 to a desired height above the ground plane G. As soon as this adjusted position has been reached, the hydraulic power is cut off to the servo-valve 398.

To return the machine 20 to its operable position, the operator pushes the Bowden cable wire 422 to force the bell-crank lever 318 to turn in a clockwise direction thereby disengaging the roller 322 from beneath the stem 362 and the operator then returns the power to the servo-motor 398 which supplies the necessary hydraulic fluid under pressure to the hydraulic cylinder 150 to cause the wheels 140, 142 to pivot in the reverse direction, lowering the scraper means 78, its blade 100 and cutting edge 102. It should here be noted that as the scraper blade edge 102 returns to its normal position, no adjustment need be made of the preset cutting depth control means 372.

Having described and illustrated one embodiment of this invention in detail, it will be understood that the same is offered merely by way of example, and that this invention is to be limited only by the scope of the appended claims.

What is claimed is:

1. A land leveler comprising, in combination with a tractor having front and rear wheels, and a drawbar:
an elongated hitch;
means pivotally connecting one end of said hitch on said drawbar;
scraper means fixedly secured on said hitch and depending therefrom, said scraper means including a scraper blade extending transversely of said hitch and having a lower cutting edge, said scraper means further including wheels and wheel support means pivotally connecting said scraper wheels on said scraper;
an elongated trailer;
means pivotally connecting one end of said trailer on the other end of said hitch;
a ground engaging wheel pivotally connected on the other end of said trailer;
hydraulic means operable to maintain the cutting edge of said scraper in the plane containing the points of tangency of said tractor front wheel and said trailer ground engaging wheel with the ground, said means comprising:
a hydraulic cylinder connected on said scraper means and said wheel support means and operable to effect the pivotal movement of said scraper wheels to raise and lower said cutting edge thereof;
first lever means having an end pivotally connected on said trailer;
a servo-valve fixedly mounted on said first lever means, said servo-valve having actuator means therefor disposed above said cutting edge and servo-valve being operably connected with said hydraulic cylinder;
abutment means fixedly secured on said trailer at a point longitudinally removed from the point where the first lever means is pivotally connected to said trailer, said abutment means being normally constantly engaged by said servo-valve actuator throughout the pivotal movement of said first lever means; and
means connecting the other end of said first lever means on said drawbar at a point longitudinally removed from the connection of the hitch on said drawbar, said connecting means being responsive to the tilting movement of said tractor front wheels about the axis of said tractor rear wheels to pivot said first lever means thereby actuating said servo-valve and its connected hydraulic cylinder whereby said scraper wheels pivot in such direction as to maintain said cutting edge in said plane, said connecting means being reversely operated in response to the vertical movement of said tractor rear wheels to maintain the tangency of said scraper cutting edge in said plane.

2. A land leveler as defined in claim 1 and manually operable means on said hitch operable to override said servo-valve to raise said scraper to a transport position vertically spaced above the ground.

3. A land leveler as defined in claim 1 and means on said first lever means cooperating with means on said hitch to limit the pivotal movement of said first lever means in one direction.

4. A land leveler as defined in claim 1 and manually operable means on said hitch operable to override said servo-valve to raise said scraper to a transport position vertically spaced above the ground; and means on said first lever means cooperating with means on said hitch to limit the pivotal movement of said first lever in one direction.

5. A land leveler as defined in claim 1 wherein said connecting means includes
second lever means fixedly connected on said tractor for pivotal movement in response to the pivotal movement of said tractor front wheels about the axis of its said rear wheels.

6. A land leveler as defined in claim 1 wherein said first lever means is normally positioned substantially parallel to said trailer; and
said connecting means includes second lever means rigidly connected to said drawbar for pivotal movement in response to the pivotal movement of said tractor front wheels about the axis of its said rear wheels, whereby movement of said second lever means causes pivotal movement of said first lever means and the consequent actuation of said servo-valve and hydraulic cylinder to cause said scraper wheels to pivot in such a direction as to restore the parallelism between said trailer and said first lever means.

7. A land leveler as defined in claim 1 wherein said first lever means is normally positioned substantially parallel to said trailer;
said connecting means includes second lever means having an end thereof rigidly connected to said drawbar for pivotal movement in response to the pivotal movement of said tractor front wheels about the axis of its said rear wheels;
said connecting means further including third lever means having means for adjusting its axial length thereon, said third lever means being normally upright and having an end thereof pivotally connected on the other end of said first lever means; and
said connecting means also including means connecting the other end of said third lever means with the other end of said second lever means.

8. A land leveler as defined in claim 7 wherein said included connecting means comprises
a bell-crank lever having one of its ends pivotally supported on said hitch, a second end pivotally connected with said other end of said third lever, and means connecting the third end thereof with the other end of said second lever means.

9. A land leveler as defined in claim 8 and wherein said included connecting means further comprises
a fourth lever means mounted for reciprocation on said hitch and disposed in vertically spaced relation relative to said second lever means;
means pivotally connecting one end of said fourth lever means with said third end of said bell-crank lever;
a pulley wheel rotatably supported on said hitch; and
a flexible cable trained around said pulley wheel and having an end thereof connected to the other ends of said second and fourth lever means.

10. A land leveler as defined in claim 9 and means for overriding said servo-valve comprising
a second bell-crank lever having a first end pivotally supported on said trailer, a second end of said second bell-crank lever being normally juxtaposed relative to said first lever means in spaced relation relative thereto, and manually operable means connected to said third end of said second bell-crank lever and operable to pivot said second bell-crank lever to engage said second end theerof with said first lever means to pivot said first lever means in one direction out of parallelism with said trailer and to thereby actuate said servo-valve and said hydraulic cylinder to cause said scraper wheels to pivot and elevate said scraper to a transport position.

References Cited

UNITED STATES PATENTS

| | | | |
|---|---|---|---|
| 2,732,640 | 1/1956 | Kirchner | 172—4.5 |
| 2,846,792 | 8/1958 | Hobday | 172—4.5 |
| 3,353,288 | 11/1967 | Waterson | 172—4.5 |

ROBERT E. PULFREY, Primary Examiner

J. W. PETERSON, Assistant Examiner

U.S. Cl. X.R.

172—675